(12) United States Patent
Okano et al.

(10) Patent No.: US 11,482,849 B2
(45) Date of Patent: Oct. 25, 2022

(54) WIRE COVER

(71) Applicant: SUMITOMO WIRING SYSTEMS, LTD., Mie (JP)

(72) Inventors: Hiroki Okano, Mie (JP); Naoki Hikota, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/372,017

(22) Filed: Jul. 9, 2021

(65) Prior Publication Data

US 2022/0021194 A1 Jan. 20, 2022

(30) Foreign Application Priority Data

Jul. 14, 2020 (JP) .............................. JP2020-120585

(51) Int. Cl.
*H02G 3/06* (2006.01)
*H02G 15/113* (2006.01)

(52) U.S. Cl.
CPC .................................. *H02G 15/113* (2013.01)

(58) Field of Classification Search
CPC .... H02G 15/10; H02G 15/113; H02G 3/0691; H02G 3/08; H02G 3/081; H02G 3/083; H05K 5/0247; H05K 5/0217; B60R 16/0207; B60R 16/0215; B60R 16/0239
See application file for complete search history.

(56) References Cited

U.S. PATENT DOCUMENTS

| | | | |
|---|---|---|---|
| 6,037,543 A * | 3/2000 | Nicoli ................. | H02G 3/0608 52/287.1 |
| 7,581,564 B2 * | 9/2009 | Tanaka ................... | F16L 57/00 174/72 A |
| 2017/0179697 A1 * | 6/2017 | Terashima ........... | H02G 3/0462 |
| 2017/0331263 A1 * | 11/2017 | Matsumura .......... | H02G 3/0437 |
| 2021/0016727 A1 * | 1/2021 | Kimura ................ | H01B 7/0045 |

FOREIGN PATENT DOCUMENTS

JP  2015-210967 A  11/2015

* cited by examiner

*Primary Examiner* — Hoa C Nguyen
*Assistant Examiner* — Amol H Patel
(74) *Attorney, Agent, or Firm* — Venjuris, P.C.

(57) ABSTRACT

A wire cover 1 includes a first cover member 2 and a second cover member 3 for covering wires W in a united state. Each of the first and second cover members includes wire paths 12, 13, restricting portions 20, 21 and escaping spaces 22, 23. In the united state, the restricting portions 20, 21 of the first cover member 2 project toward the second cover member 3 and the restricting portions 20, 21 of the second cover member 3 project toward the first cover member 2. The restricting portions 20, 21 of the second cover member 3 are arranged in the escaping spaces 23, 22 of the first cover member 2. The restricting portions 20, 21 of the first cover member are arranged in the escaping spaces 23, 22 of the second cover member.

5 Claims, 8 Drawing Sheets

WIRE COVER

CROSS-REFERENCE TO RELATED APPLICATIONS

This application is based on and claims priority from Japanese Patent Application No. 2020-120585, filed on Jul. 14, 2020, with the Japan Patent Office, the disclosure of which is incorporated herein in its entirety by reference.

TECHNICAL FIELD

The present disclosure relates to a wire cover.

BACKGROUND

Japanese Patent Laid-open Publication No. 2015-210967 discloses a cover for leading out a wire pulled out from the rear surface of a connector housing in a predetermined direction while bending the wire. This cover is formed by uniting an upper cover with a lower cover. The lower cover is formed with a longitudinal rib. The wire pulled out from the rear surface of the connector housing is bent while being brought into contact with the longitudinal rib. The longitudinal rib projects toward the upper cover and suppresses the detachment of the wire arranged in the lower cover from the lower cover due to the lift of the wire.

SUMMARY

However, since only one cover is provided with the longitudinal rib in the cover of this type, an assembling procedure of first arranging the wire in the other cover is difficult.

Accordingly, the present disclosure aims to improve the assembly convenience of a wire cover.

The present disclosure is directed to a wire cover with a first cover member and a second cover member for covering a wire in a united state, wherein each of the first and second cover members includes a wire path, a restricting portion and an escaping space, the wire path is a path in which the wire is arranged and which includes a bend part, the restricting portion and the escaping space are provided on an inner angle side of the bend part of the wire path and, in the united state, the restricting portion of the first cover member projects toward the second cover member, the restricting portion of the second cover member projects toward the first cover member, the restricting portion of the second cover member is arranged in the escaping space of the first cover member and the restricting portion of the first cover member is arranged in the escaping space of the second cover member.

According to the present disclosure, the assembly convenience of a wire cover can be improved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF PRESENT DISCLOSURE

First, embodiments of the present disclosure are listed and described.

(1) The wire cover of the present disclosure includes a first cover member and a second cover member for covering a wire in a united state, wherein each of the first and second cover members includes a wire path, a restricting portion and an escaping space, the wire path is a path in which the wire is arranged and which includes a bend part, the restricting portion and the escaping space are provided on an inner angle side of the bend part of the wire path and, in the united state, the restricting portion of the first cover member projects toward the second cover member, the restricting portion of the second cover member projects toward the first cover member, the restricting portion of the second cover member is arranged in the escaping space of the first cover member and the restricting portion of the first cover member is arranged in the escaping space of the second cover member.

In this wire cover, the wire path and the restricting portion are provided in each of the first and second cover members. Thus, in either cover member, the wire can be arranged in the wire path and it can be suppressed that the wire bent and arranged is lifted to be detached from the wire path. Further, each of the first and second cover members includes the escaping space, and the restricting portion of the mating cover member is arranged in this escaping space. Thus, in this wire cover, the restricting portions of the first and second cover members do not interfere with each other when the first and second cover members are united. That is, according to this wire cover, the wire can be arranged in either cover member and the wire cover can be assembled by putting the mating cover member on the cover member having the wire arranged therein. Therefore, according to this wire cover, the assembly convenience of the wire cover is improved.

(2) Preferably, each of the first and second cover members includes a wire lead-in port, a first wire lead-out port and a second wire lead-out port, the first and second wire lead-out ports are open in directions different from each other, the wire paths include a first wire path arranged from the wire lead-in port to the first wire lead-out port and a second wire path arranged from the wire lead-in port to the second wire lead-out port, the bend parts include a first bend part provided between the wire lead-in port and the first wire lead-out port and a second bend part provided between the wire lead-in port and the second wire lead-out port, the restricting portions include a first restricting portion provided on an inner angle side of the first bend part and a second restricting portion provided on an inner angle side of the second bend part in each of the first and second cover members, the escaping spaces include a first escaping space provided on the inner angle side of the first bend part and a second escaping space provided on the inner angle side of the second bend part in each of the first and second cover members, the second restricting portion of the second cover member is arranged in the first escaping space of the first cover member and the first restricting portion of the first cover member is arranged in the second escaping space of the second cover member in the united state, and the first restricting portion of the second cover member is arranged in the second escaping space of the first cover member and the second restricting portion of the first cover member is arranged in the first escaping space of the second cover member in the united state.

Since this wire cover includes the first and second wire lead-out ports open in the directions different from each other, the wires can be led out in two directions. Further, in this wire cover, the lift of the wire arranged in the cover member to be detached from the wire path can be suppressed by the restricting portion, regardless of from which of the first and second wire lead-out ports the wire is led out.

(3) Preferably, the first escaping space and the second restricting portion are arranged at positions line-symmetrical with respect to a line of symmetry passing through a center of the wire lead-in port in each of the first and second cover members, the second escaping space and the first restricting portion are arranged at positions line-symmetrical with respect to the line of symmetry in each of the first and second cover members, and the first and second restricting portions are arranged at positions non-symmetrical with respect to the line of symmetry in each of the first and second cover members.

In this wire cover, the first and second cover members can have the same shape or nearly the same shape while the mutual interference of the first restricting portion of the first cover member and the second restricting portion of the second cover member is avoided.

(4) The first and second cover members more preferably have the same shape than having nearly the same shape.

If the first and second cover members have the same shape, one type of molds can be used, with the result that the manufacturing cost and the like of the molds can be reduced.

(5) Preferably, the escaping space of the first cover member has a communication space communicating with the wire path, the restricting portion of the second cover member includes a path-side restricting portion to be arranged in the communication space of the first cover member, and a tip part of the path-side restricting portion has an inclined surface inclined in a direction to expand the wire path.

If the restricting portion of the second cover member is arranged in the communication space of the first cover member, this restricting portion may bite into the wire arranged in the wire path of the first cover member. However, in this wire cover, the path-side restricting portion to be arranged in the communication space has the inclined surface inclined in the direction to expand the wire path. Thus, even if the restricting portion of the second cover member contacts the wire arranged in the wire path when entering the escaping space of the first cover member, the inclined surface pushes the wire toward the wire path. Therefore, in this wire cover, the bite of the restricting portion of the second cover member into the wire arranged in the first cover member can be suppressed even if this restricting portion is arranged in the communication space of the first cover member.

DETAILS OF EMBODIMENT OF PRESENT DISCLOSURE

A specific example of the present disclosure is described below with reference to the drawings. Note that the present invention is not limited to these illustrations and is intended to be represented by claims and include all changes in the scope of claims and in the meaning and scope of equivalents.

Embodiment

A wire cover 1 for bending and leading out a predetermined number of (two in this embodiment) wires W is illustrated in an embodiment. The wire cover 1 is made of synthetic resin and includes a first cover member 2 and a second cover member 3 (hereinafter, also referred to as the cover members 2, 3) for covering the wires W in a state united with each other.

Figure 5:
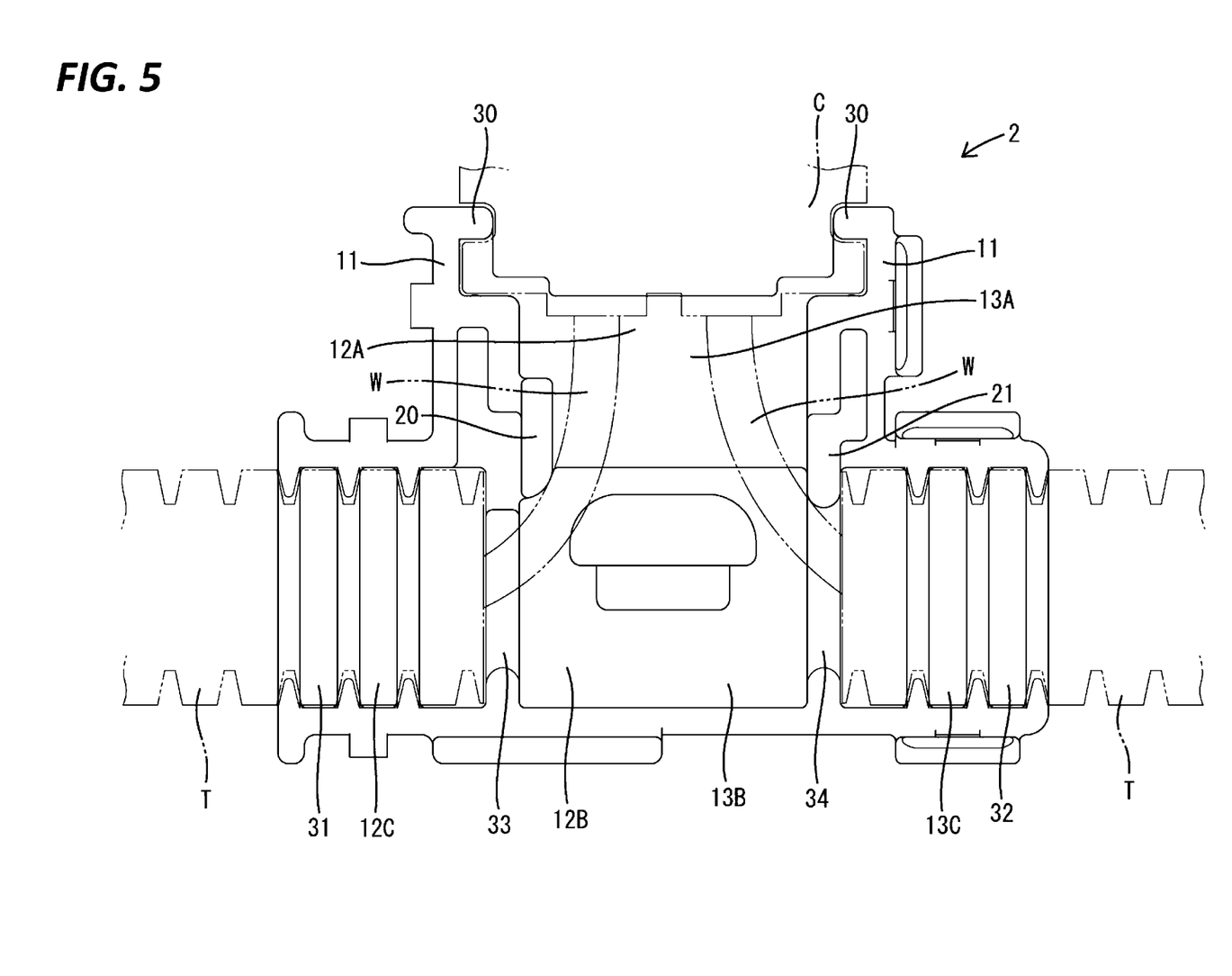
FIG. 5 is a plan view showing a state where wires are arranged in the first cover member.

Note that, in the following description, a vertical direction is based on a vertical direction in FIGS. 1, 3 and 6 to 8. A lower side and an upper side shown in FIGS. 2 and 5 are referred to as a front side and a rear side concerning a front-rear direction. A lateral direction is based on a lateral direction shown in FIGS. 2 and 5, and a left side and a right side shown in FIG. 3 are referred to as a right side and a left side. That is, a uniting direction of uniting the first and second cover members 2, 3 with each other is the vertical direction. Further, directions intersecting (e.g. orthogonal to) the uniting direction are the vertical and lateral directions.

The cover members 2, 3 have the same shape. Thus, the shape of the first cover member 2 arranged on a lower side is mainly described and the shape of the second cover member 3 arranged on an upper side is not described. Note that the concepts of the vertical and lateral directions are opposite in the first and second cover members 2, 3.

Figure 1:
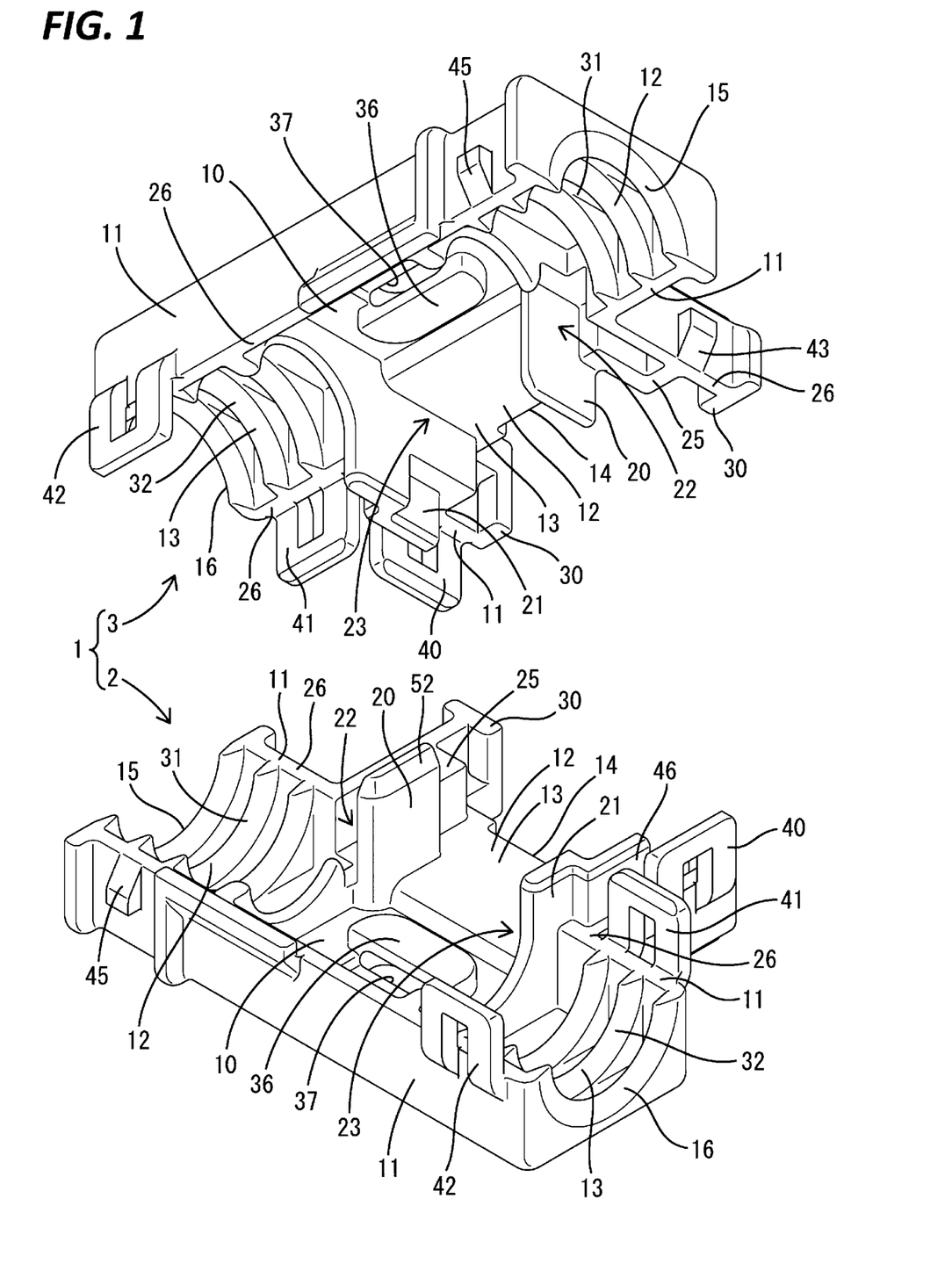
FIG. 1 is an exploded perspective view of a wire cover according to one embodiment.
Figure 2:
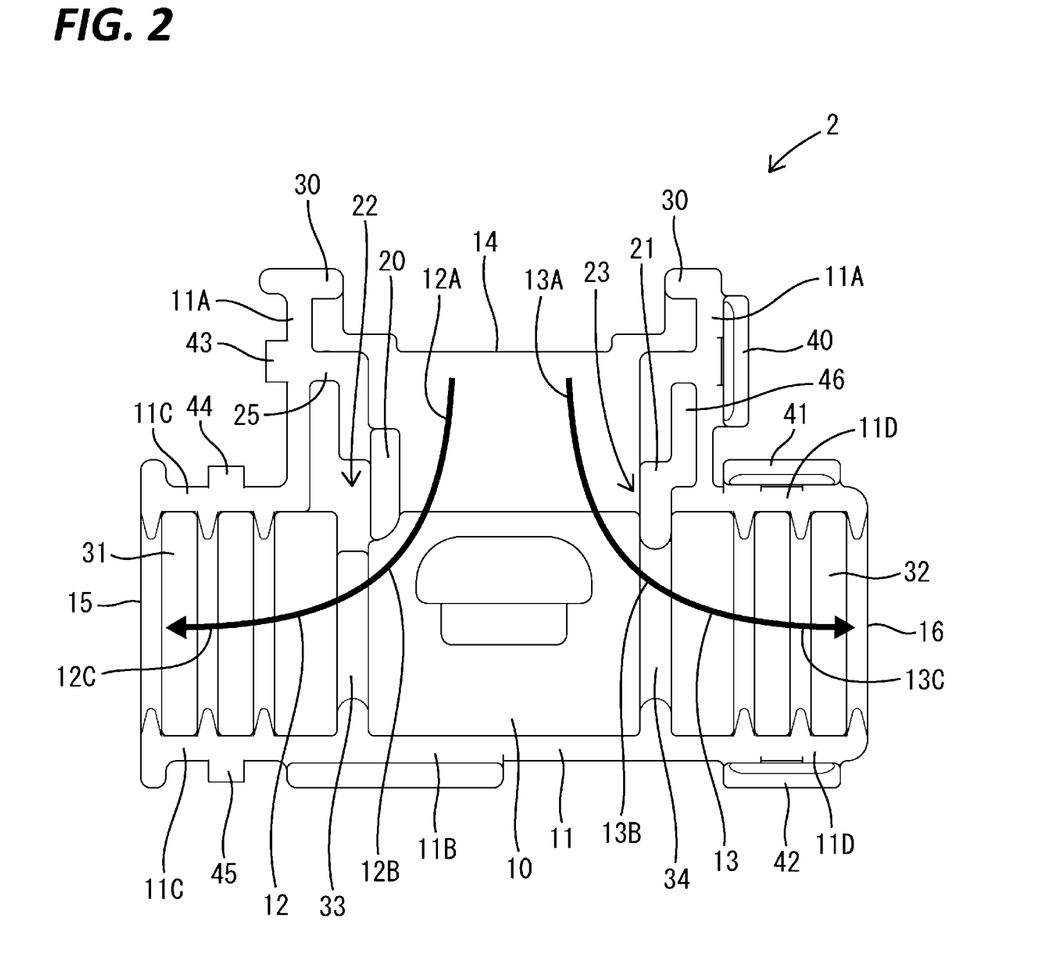
FIG. 2 is a plan view of a first cover member.
Figure 3:
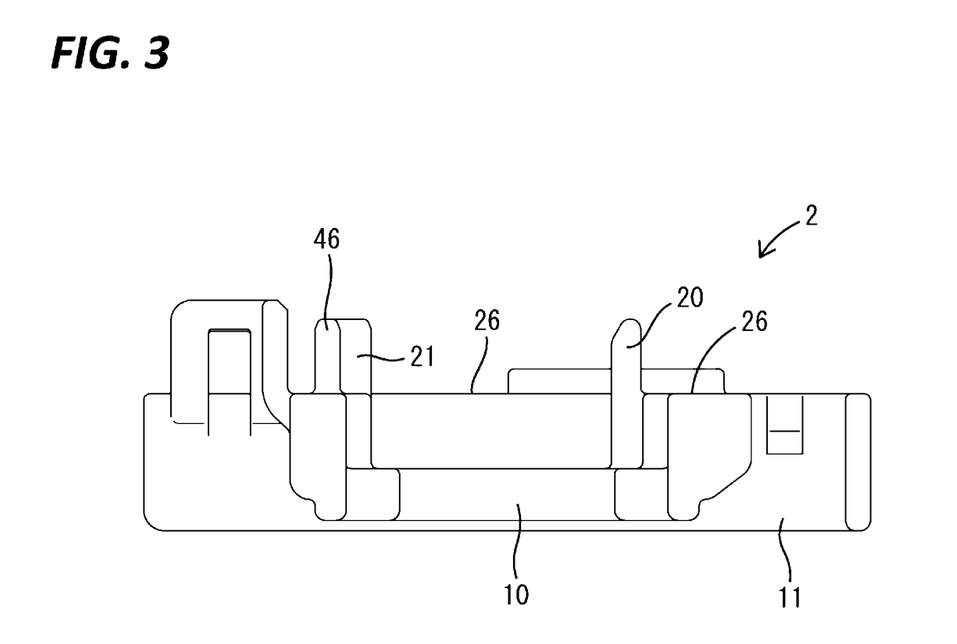
FIG. 3 is a back view of the first cover member.

As shown in FIGS. 1 and 2, the first cover member 2 includes a bottom wall portion 10, side wall portions 11, a first wire path 12, a second wire path 13, a wire lead-in port 14, a first wire lead-out port 15 and a second wire lead-out port 16. The bottom wall portion 10 is in the form of a plate and T-shaped in a plan view. The upper surface of the bottom wall portion 10 constitutes the bottom surfaces of the first wire path 12 and the second wire path 13 (hereinafter, also referred to as the wire paths 12, 13). Each wire W is arranged along the bottom surface of the wire path 12, 13. The side wall portions 11 are formed to rise upward from end edges of the bottom wall portion 10 and arranged on both sides of the wire paths 12, 13.

The wire paths 12, 13 are paths in which the wires W are arranged, extend forward from a part formed with the wire lead-in port 14 and are branched to the left and right. The first wire path 12 branched to the left is open leftward in the first wire lead-out port 15. The second wire path 13 branched to the right is open rightward in the second wire lead-out port 16. That is, the wire paths 12, 13 are T-shaped in a plan view. The wire paths 12, 13 are exposed to an upper side of the first cover member 2.

The first wire path 12 is a path arranged from the wire lead-in port 14 to the first wire lead-out port 15. As shown in FIG. 2, the first wire path 12 includes a first before-bend part 12A, a first bend part 12B and a first after-bend part 12C. The first bend part 12B is a bent part of the first wire path 12 and provided between the wire lead-in port 14 and the first wire lead-out port 15. The first bend part 12B is bent to the left from the first before-bend part 12A. The wire W arranged in the first wire path 12 is bent to the left in the first bend part 12B. A bending angle of the first bend part 12B is $\pi/2$ radians (90°). The first before-bend part 12A is a part closer to the wire lead-in port 14 than the first bend part 12B and extends along the front-rear direction. The first after-bend part 12C is a part closer to the first wire lead-out port 15 than the first bend part 12B and extends along the lateral direction. That is, the first before-bend part 12A and the first after-bend part 12C are arranged to intersect (be orthogonal) via the first bend part 12B.

As shown in FIG. 2, the second wire path 13 is a path arranged from the wire lead-in port 14 to the second wire lead-out port 16. The second wire path 13 includes a second before-bend part 13A, a second bend part 13B and a second after-bend part 13C. The second bend part 13B is a bent part of the second wire path 13 and provided between the wire lead-in port 14 and the second wire lead-out port 16. The second bend part 13B is bent to the right from the second before-bend part 13A. The wire W arranged in the second wire path 13 is bent to the right in the second bend part 13B. A bending angle of the second bend part 13B is $\pi/2$ radians (90°). The second before-bend part 13A is a part closer to the wire lead-in port 14 than the second bend part 13B. The second before-bend part 13A is the same part as the first before-bend part 12A. The second after-bend part 13C is a part closer to the second wire lead-out port 16 than the second bend part 13B. That is, the second before-bend part 13A and the second after-bend part 13C are arranged to intersect (be orthogonal) via the second bend part 13B.

As shown in FIG. 2, the aforementioned side wall portions 11 include first side wall portions 11A, a second side wall portion 11B, third side wall portions 11C and fourth side wall portions 11D. The first side wall portions 11A extend along the front-rear direction and are arranged on both left and right sides of the first and second before-bend parts 12A, 13A. The second side wall portion 11B extends along the lateral direction and is arranged to face the wire lead-in port 14. The third side wall portions 11C extend along the lateral direction and are arranged on both front and rear sides of the first after-bend part 12C. The fourth side wall portions 11D extend along the lateral direction and are arranged on both front and rear sides of the second after-bend part 13C. The third side wall portion 11C on the front side, the second side wall portion 11B and the fourth side wall portion 11D on the front side are continuous in the lateral direction.

As shown in FIG. 2, the first cover member 2 includes a first restricting portion 20, a second restricting portion 21, a first escaping space 22 and a second escaping space 23.

Figure 4:
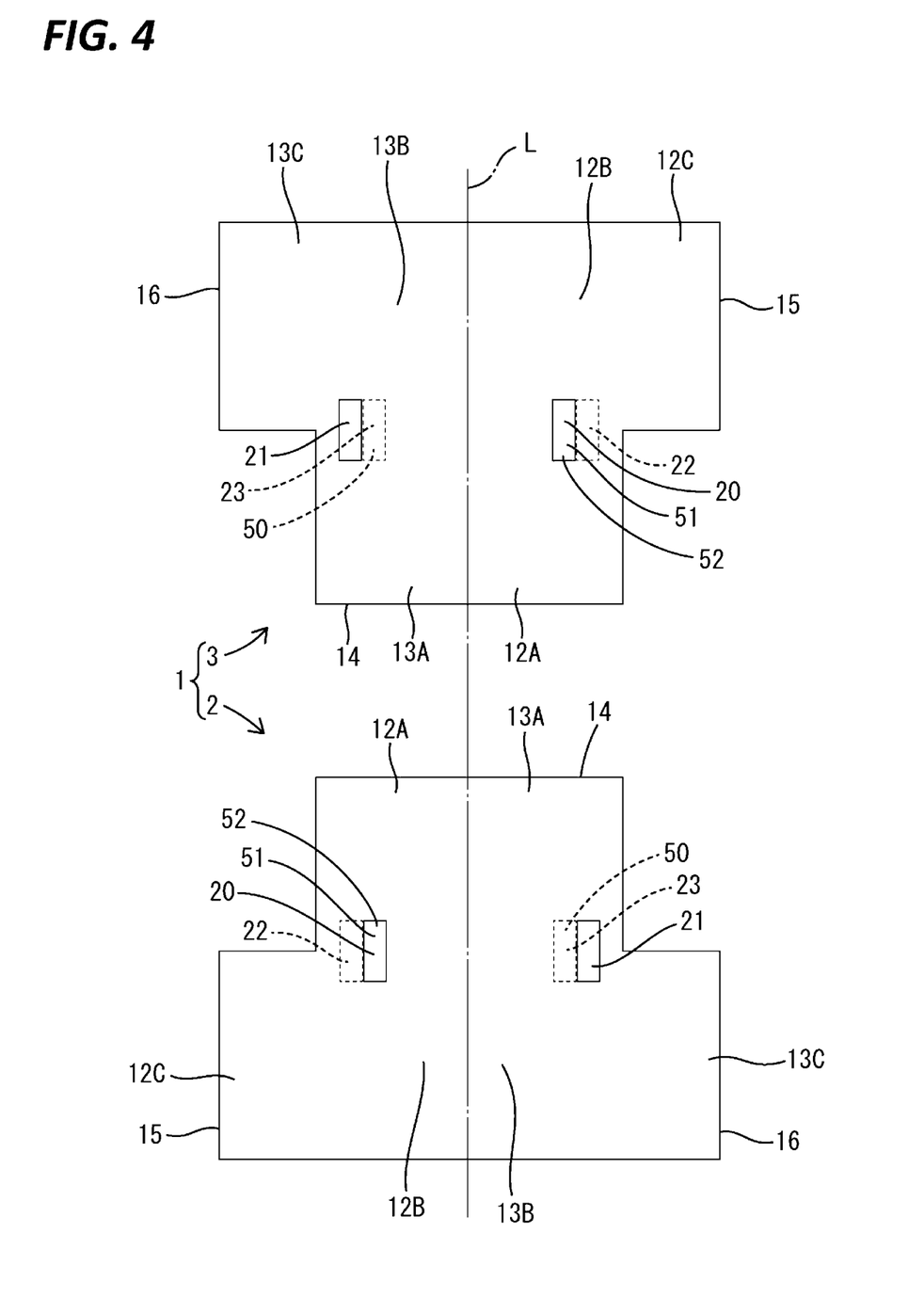
FIG. 4 is a diagram conceptually showing a positional relationship of first restricting portions, second restricting portions, first escaping spaces and second escaping spaces.

The first restricting portion 20 and the first escaping space 22 are provided on an inner angle side of the first bend part 12B (in particular, an inner angle side of a part formed by the first before-bend part 12A, the first bend part 12B and the first after-bend part 12C and L-shaped in a plan view). In short, the first restricting portion 20 and the first escaping space 22 are provided inside a bend of the wire W. The first restricting portion 20 restricts a movement of the wire W arranged in the first bend part 12B to the inside of the bend. The first restricting portion 20 is integrally formed to the first side wall portion 11A on the left side via a coupling portion 25 arranged behind the first escaping space 22. The rear end of the first restricting portion 20 is arranged behind the front surface of the third side wall portion 11C on the rear side. The front end of the first restricting portion 20 is arranged in front of the front surface of the third side wall portion 11C on the rear side. The first escaping space 22 is arranged between the first restricting portion 20 and the first side wall portion 11A on the left side. The first restricting portion 20 is arranged between the first escaping space 22 and the first bend part 12B. As shown in FIG. 4, the first escaping space 22 is a space region corresponding to the shape of the second restricting portion 21.

The second restricting portion 21 and the second escaping space 23 are provided on an inner angle side of the second bend part 13B (in particular, an inner angle side of a part formed by the second before-bend part 13A, the second bend part 13B and the second after-bend part 13C and L-shaped in a plan view). In short, the second restricting portion 21 and the second escaping space 23 are provided inside a bend of the wire W. The second restricting portion 21 restricts a movement of the wire W arranged in the second bend part 13B to the inside of the bend. The second restricting portion 21 is integrally formed to the first side wall portion 11A on the right side. The rear end of the second restricting portion 21 is arranged behind the front surface of the fourth side wall portion 11D on the rear side. The front end of the second restricting portion 21 is arranged in front of the front surface of the fourth side wall portion 11D on the rear side. The second escaping space 23 communicates with the second bend part 13B on a left side of the second restricting portion 21 (communication space 50 to be described later). As shown in FIG. 4, the second escaping space 23 is a space region corresponding to the shape of the first restricting portion 20.

As shown in FIG. 4, the first escaping space 22 and the second restricting portion 21 are arranged at positions line-symmetrical with respect to a line of symmetry L extending in the front-rear direction through a center (widthwise center) of the wire lead-in port 14 in a plan view. The line of symmetry L is also a line laterally dividing the entire first cover member 2. The second escaping space 23 and the first restricting portion 20 are arranged at positions line-symmetrical with respect to the line of symmetry L in a plan view. In other words, the first and second restricting portions 20, 21 are arranged at positions non-symmetrical with respect to the line of symmetry L.

Each of the first and second restricting portions 20, 21 (hereinafter, also referred to as the restricting portions 20, 21) is formed to rise and project upward from the upper surface of the bottom wall portion 10 as shown in FIG. 1. Inner side surfaces of the restricting portions 20, 21 constitute side surfaces of the wire paths 12, 13. A height of each of the restricting portions 20, 21 is so set that the wire W arranged in the wire path 12, 13 does not move beyond even if being lifted. Projecting dimensions of the restricting portions 20, 21 from the bottom wall portion 10 are larger than those of the side wall portions 11 from the bottom wall portion 10. As shown in FIG. 3, each of the restricting portions 20, 21 of the first cover member 2 projects further upward than a contact surface 26 where the side wall portions 11 of the both cover members 2, 3 are in contact in the united state. In this way, it can be suppressed that the wires W arranged in the wire paths 12, 13 are lifted to be detached from the wire paths 12, 13 while a vertical dimension of the wire cover 1 is suppressed to be small. Each of the restricting portions 20, 21 is in the form of a plate piece and shaped to be long in the front-rear direction.

As shown in FIG. 5, the first cover member 2 includes connector mounting portions 30, a first tube mounting portion 31 and a second tube mounting portion 32. The connector mounting portions 30 are parts where a connector C is to be mounted and provided in a rear end part of the side wall portions 11 (more specifically, the first side wall portion 11A).

The first and second tube mounting portions 31, 32 (hereinafter, also referred to as the tube mounting portions 31, 32) are parts where corrugated tubes T covering the wires W are to be mounted. The corrugated tube T has a tubular (more specifically hollow cylindrical) shape, and an inner diameter thereof is larger than an outer diameter of the wire W. Thus, the wire W arranged inside the corrugated tube T is easily displaced in a radial direction with respect to the corrugated tube T. The tube mounting portion 31, 32 is formed with a plurality of grooves into which a plurality of projections of the corrugated tube T are fit. The corrugated tube T is mounted in the tube mounting portion 31, 32 with the respective projections fit in the respective grooves.

As shown in FIG. 5, the first tube mounting portion 31 is arranged in the first after-bend part 12C. The first tube mounting portion 31 includes a first positioning portion 33. The first positioning portion 33 is formed on an end part of the first tube mounting portion 31 on the side of the first bend part 12B (right side) and shaped to rise from the bottom surface of the first wire path 12. The first positioning portion 33 restricts an end part of the corrugated tube T mounted in the first tube mounting portion 31 on the side of the first bend part 12B (right side) from moving toward the first bend part 12B (right side). The aforementioned first restricting portion 20 is arranged at a position shifted to the right from the first positioning portion 33.

As shown in FIG. 5, the second tube mounting portion 32 is arranged in the second after-bend part 13C. The second tube mounting portion 32 includes a second positioning portion 34. The second positioning portion 34 is formed on an end part of the second tube mounting portion 32 on the side of the second bend part 13B (left side) and shaped to rise from the bottom surface of the second wire path 13. The second positioning portion 34 restricts an end part of the corrugated tube T mounted in the second tube mounting portion 32 on the side of the second bend part 13B (left side) from moving toward the second bend part 13B (left side). The aforementioned second restricting portion 21 is laterally aligned in position with the second positioning portion 34 and continuously and integrally formed to the second positioning portion 34.

As shown in FIG. 1, the first cover member 2 includes a drainage portion 36 for draining water having entered the wire cover 1. The drainage portion 36 includes a drainage port 37. The bottom surfaces of the wire paths 12, 13 are formed into a stepped shape to be slightly lowered from the before-bend parts 12A, 13A to the bend parts 12B, 13B, and the drainage portion 36 is provided in the lower bottom surfaces. The drainage portion 36 is shaped to protrude upward from the bottom surfaces of the wire paths 12, 13, and the drainage port 37 is open in a front surface. The upper surface of the drainage portion 36 is at the same height position as the higher bottom surfaces of the wire paths 12, 13.

Figure 8:
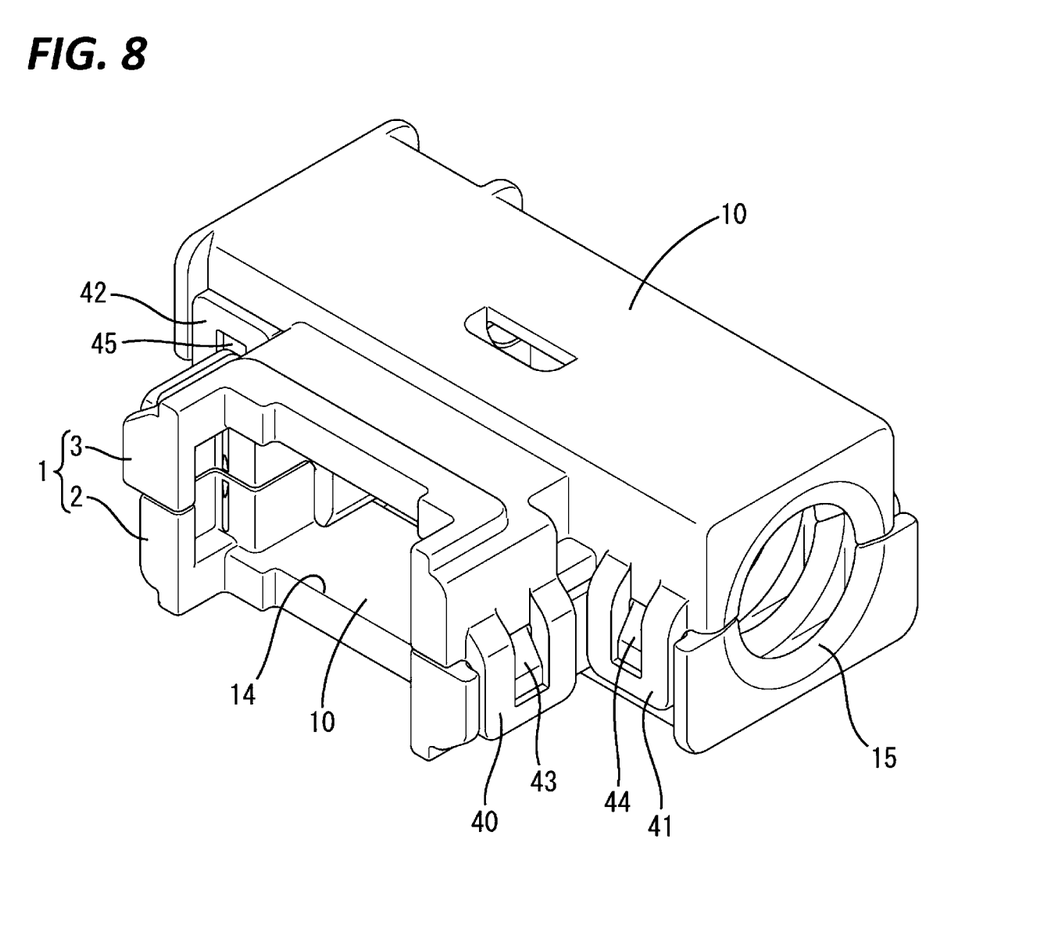
FIG. 8 is a perspective view of the wire cover when viewed from behind.

As shown in FIGS. 1, 2 and 8, the first cover member 2 includes a first lock portion 40, a second lock portion 41 and a third lock portion 42 (hereinafter, also referred to as the lock portions 40, 41 and 42). Each of the lock portions 40, 41 and 42 is formed to rise upward and project upward from the outer side surface of the side wall portion 11, and a tip part thereof is resiliently deformable in directions orthogonal to the outer side surface. The first cover member 2 includes a first lock receiving portion 43, a second lock receiving portion 44 and a third lock receiving portion 45 (hereinafter, also referred to as the lock receiving portions 43, 44 and 45). Each of the lock receiving portions 43, 44 and 45 is provided on the outer side surface of the side wall portion 11.

The lock portions 40, 41 and 42 are arranged on a right side of the first cover member 2, and the lock receiving portions 43, 44 and 45 are arranged on a left side of the first cover member 2. The first lock portion 40 is provided to the right of the before-bend parts 12A, 13A, and the first lock receiving portion 43 is provided to the left of the before-bend parts 12A, 13A. The second lock receiving portion 44 is provided behind the first after-bend part 12C, and the third lock receiving portion 45 is provided in front of the first after-bend part 12C. The second lock portion 41 is provided behind the second after-bend part 13C, and the third lock portion 43 is provided in front of the second after-bend part 13C.

As shown in FIGS. 1 and 2, the first cover member 2 includes a reinforcing rib 46. The reinforcing rib 46 is formed to rise upward and project upward from the upper surface of the bottom wall portion 10. The reinforcing rib 46 projects further upward than the contact surface 26. The tip of the reinforcing rib 46 is at the same height position as the tip of the second restricting portion 21. The reinforcing rib 46 is facing the first lock portion 40 in the lateral direction. The reinforcing rib 46 is arranged at a position closer to the first lock portion 40 than the second restricting portion 21 in the lateral direction. The reinforcing rib 46 is integrally formed to the second restricting portion 21 via a bend part between the reinforcing rib 46 and the second restricting portion 21.

An assembly method of the wire cover 1 is described below.

As shown in FIG. 5, the connector C is first mounted on the connector mounting portions 30 of the first cover member 2 by being hooked from above. Centers of the wires W pulled from the connector C mounted on the connector mounting portions 30 are at the same height position as the contact surface 26. That is, the wires W have parts projecting further upward than the contact surface 26. Out of the two wires W pulled out from the connector C, one wire W is arranged in the first wire path 12 and the other wire W is arranged in the second wire path 13. The one wire W is bent toward the first after-bend part 12C via the first restricting portion 20. The one wire W is arranged not to ride on the first restricting portion 20. The corrugated tube T covering the one wire W is mounted into the first tube mounting portion 31. The other wire W is bent toward the second after-bend part 13C via the second restricting portion 21. The other wire W is arranged not to ride on the second restricting portion 21. The corrugated tube T covering the other wire W is mounted into the second tube mounting portion 32.

The second cover member 3 is united with the first cover member 2 having the wires W arranged therein from above. The second cover member 3 is another member having the same shape as the first cover member 2 and to be united with the first cover member 2 in the same posture as the first cover member 2 rotated by π radians (180°) about the line of symmetry L.

As described above, the first escaping space 22 and the second restricting portion 21 are arranged at the positions line-symmetrical with respect to the line of symmetry L passing through the center of the wire lead-in port 14 in a plan view. Thus, in the process of uniting the cover members 2, 3 with each other, a second restricting portion 21 of the second cover member 3 enters the first escaping space 22 of the first cover member 2 and the second restricting portion 21 of the first cover member 2 enters a first escaping space 22 of the second cover member 3.

Further, as described above, the second escaping space 23 and the first restricting portion 20 are arranged at the positions line-symmetrical with respect to the line of symmetry L in a plan view. Thus, in the process of uniting the cover members 2, 3 with each other, a first restricting portion 20 of the second cover member 3 enters the second escaping space 23 of the first cover member 2 and the first restricting portion 20 of the first cover member 2 enters a second escaping space 23 of the second cover member 3.

In other words, the first and second restricting portions 20, 21 are arranged at the positions non-symmetrical with respect to the line of symmetry L in a plan view. Thus, in the process of uniting the cover members 2, 3 with each other, the first restricting portion 20 of the first cover member 2 and the second restricting portion 21 of the second cover member 3 do not interfere with each other and the second restricting portion 21 of the first cover member 2 and the first restricting portion 20 of the second cover member 3 do not interfere with each other.

Figure 6:
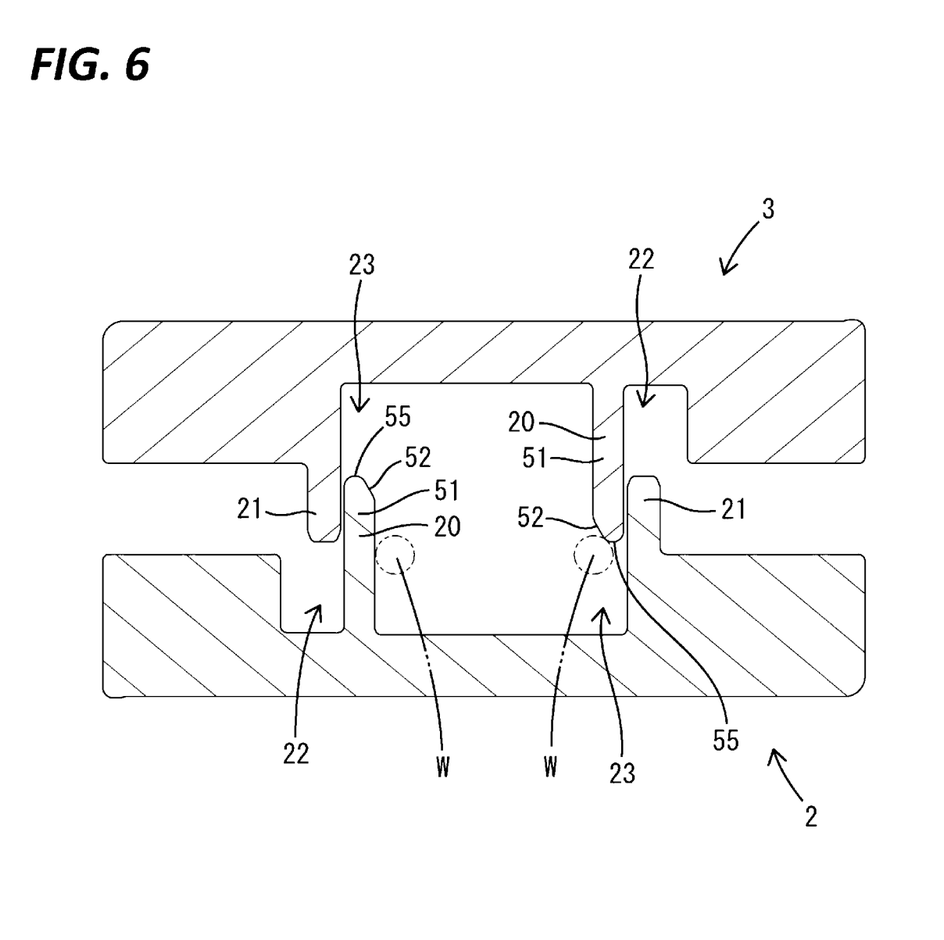
FIG. 6 is a section showing a state where an inclined surface of the first restricting portion contacts the wire in the process of uniting the first cover member and a second cover member with each other.
Figure 7:
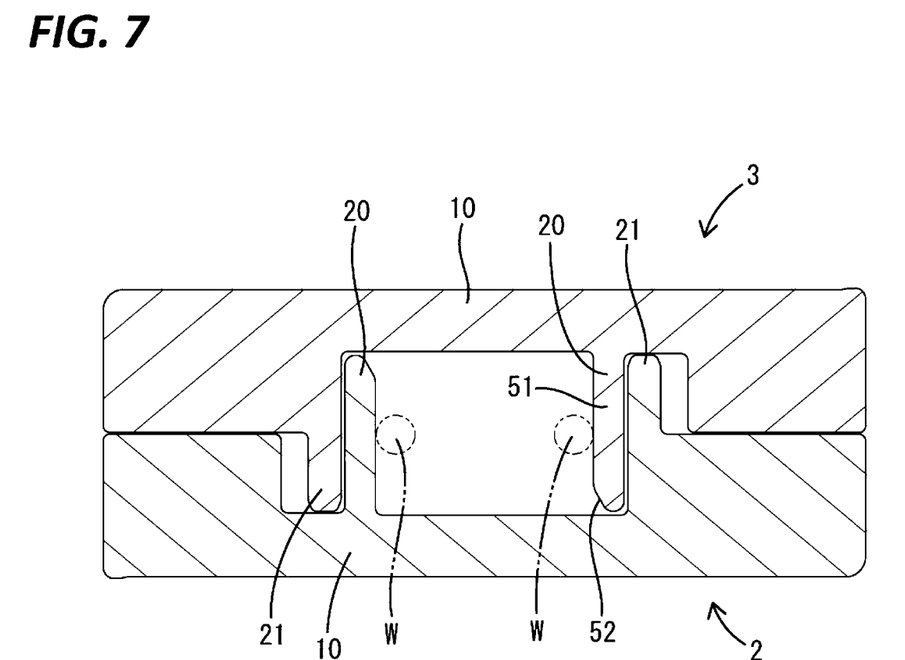
FIG. 7 is a section when a united state is reached from the state shown in FIG. 6.

However, as shown in FIG. 4, the second escaping space 23 has the communication space 50 allowing communication between the wire paths 12, 13. The first restricting portion 20 arranged in this second escaping space 23 includes a path-side restricting portion 51 to be arranged in the communication space 50. This path-side restricting portion 51 may bite into the wire W arranged in the wire path 12, 13. However, a tip part of the path-side restricting portion 51 has an inclined surface 52 inclined toward a side opposite to the wire path 12, 13 toward a tip as shown in FIGS. 1, 6 and 7. Thus, even if an inclined surface 52 of the second cover member 3 contacts the wire W arranged in the wire path 12, 13 as shown in FIG. 6 in the process of uniting the cover members 2, 3 with each other, the inclined surface 52 of the second cover member 3 pushes the wire W toward the wire path 12, 13 as shown in FIG. 7. Therefore, the bite of the first restricting portion 20 into the wire W is suppressed.

Further, the path-side restricting portion 51 includes a curved portion 55 on the tip part. The curved portion 55 is convexly curved toward the tip side of the path-side restricting portion 51 in the lateral direction. The curved portion 55 is arranged on a side opposite to the wire path 12, 13 (before-bend part 12A, 13A) with respect to the inclined surface 52. The inclined surface 52 is inclined to approach the bottom wall portion 10 from the curved portion 55 toward the wire path 12, 13 (before-bend part 12A, 13A). Thus, even if the wire W contacts a part of the path-side restricting portion 51 opposite to the wire path 12, 13 (before-bend part 12A, 13A) with respect to the inclined surface 52, the wire W is easily pushed toward the inclined surface 52 by the curved portion 55. Therefore, the bite of the first restricting portion 20 into the wire W is further suppressed.

In the process of uniting the cover members 2, 3, the respective lock portions 40, 41 and 42 of the first cover member 2 are pushed and deflected outward by lock receiving portions 43, 44 and 45 of the second cover member 3. If the cover members 2, 3 are further united and resiliently return, the respective lock portions 40, 41 and 42 of the first cover member 2 are locked to the lock receiving portions 43, 44 and 45 of the second cover member 3 as shown in FIG. 8. Lock portions 40, 41 and 42 of the second cover member 3 are also similarly locked to the lock receiving portions 43, 44 and 45 of the first cover member 2. In this way, the cover members 2, 3 are united and the wire cover 1 is completed.

The united state of the wire cover 1 is as follows. As shown in FIG. 7, each of the restricting portions 20, 21 of the first cover member 2 projects toward a bottom wall portion 10 of the second cover member 3. Each of the restricting portions 20, 21 of the second cover member 3 projects toward the bottom wall portion 10 of the first cover member 2. As shown in FIGS. 6 and 7, the second restricting portion 21 of the second cover member 3 is arranged in the second escaping space 23 of the first cover member 2. The first restricting portion 20 of the second cover member 3 is arranged in the second escaping space 23 of the first cover member 2. The second restricting portion 21 of the first cover member 2 is arranged in the first escaping space 22 of the second cover member 3. The first restricting portion 20 of the first cover member 2 is arranged in the second escaping space 23 of the second cover member 3.

Although not shown, in the united state of the cover members 2, 3, the reinforcing rib 46 of the first cover member 2 sandwiches a first side wall portion 11A of the second cover member 3 together with the first lock portion 40. Thus, the reinforcing rib 46 of the first cover member 2 restricts a movement of the first side wall portion 11A of the second cover member in a direction away from the first lock portion 40 of the first cover member 2. Therefore, a holding force when the first lock portion 40 of the first cover member 2 is locked to the first lock receiving portion 43 of the second cover member 3 is improved. Further, the reinforcing rib 46 is continuously and integrally formed to the second restricting portion 21. Thus, the reinforcing rib 46 and the second restricting portion 21 reinforce each other. Note that a reinforcing rib 46 of the second cover member 3 also exhibits functions and effects similar to those of the reinforcing rib 46 of the first cover member 2.

As described above, in the wire cover 1 of this embodiment, the wire paths 12, 13 and the restricting portions 20, 21 are provided in each of the cover members 2, 3. Thus, in either cover member 2, 3, the wires W can be arranged in the wire paths 12, 13 and it can be suppressed that the wires W bent and arranged are lifted to be detached from the wire paths 12, 13. Further, each of the cover members 2, 3 includes the escaping spaces 22, 23, and the restricting portions 21, 20 of one cover member are arranged in the escaping spaces 23, 22 of the other cover member. Thus, in this wire cover 1, the restricting portions 20, 21 of the cover members 2, 3 do not interfere with each other when the cover members 2, 3 are united. That is, in this wire cover 1, the wires W can be arranged in either cover member 2, 3, and the wire cover 1 can be assembled by putting the mating cover member on the cover member 2, 3 having the wires W arranged therein. Therefore, according to this wire cover 1, the assembly convenience of the wire cover 1 is improved.

Further, this wire cover 1 includes the wire lead-out ports 15, 16 open in the directions different from each other. Thus, this wire cover 1 can lead out the wires in two directions. Moreover, in this wire cover 1, the lift of the wire W arranged in the cover member 2, 3 to be detached from the wire path 12, 13 can be suppressed by the restricting portion 20, 21, regardless of from which of the wire lead-out ports 15, 16 the wire W is led out.

Further, the first escaping space 22 and the second restricting portion 21 are arranged at the positions line-symmetrical with respect to the line of symmetry L passing through the center of the wire lead-in port 14 in each of the cover members 2, 3. The second escaping space 23 and the first restricting portion 20 are arranged at the positions line-symmetrical with respect to the line of symmetry L in each of the cover members 2, 3. The first and second restricting portions 20, 21 are arranged at the positions non-symmetrical with respect to the line of symmetry L in each of the cover members 2, 3. Thus, the cover members 2, 3 can have the same shape or nearly the same shape while the interference of the first restricting portion 20 of the first cover member 2 and the second restricting portion 21 of the second cover member 3 and the interference of the second restricting portion 21 of the first cover member 2 and the first restricting portion 20 of the second cover member 3 are avoided.

Further, the cover members 2, 3 have the same shape. Thus, according to this wire cover 1, the types of molds can be reduced, with the result that the manufacturing cost and the like of the molds can be reduced.

Further, since the first restricting portion 20 of the second cover member 3 is arranged in the communication space 50 of the first cover member 2, this first restricting portion 20 may bite into the wire W arranged in the second wire path 13 of the first cover member 2. However, in this wire cover 1, a path-side restricting portion 51 of the second cover member 3 arranged in the communication space 50 of the first cover member 2 has an inclined surface 52 inclined in a direction to expand the wire path 12, 13. Thus, even if the first restricting portion 20 of the second cover member 3 contacts the wire W arranged in the wire path 12, 13 when entering the second escaping space 23 of the first cover member 2, the inclined surface 52 pushes the wire W toward the wire path 12, 13. Thus, in this wire cover 1, the bite of the first restricting portion 20 of the second cover member 3 into the wire W arranged in the first cover member 2 can be suppressed even if this first restricting portion 20 is arranged in the communication space 50 of the first cover member 2. Further, the first restricting portion 20 of the first cover member 2 likewise has the inclined surface 52. Thus, in this wire cover 1, the bite of the first restricting portion 20 of the first cover member 2 into the wire W arranged in the second cover member 3 can be suppressed even if this first restricting portion 20 is arranged in a communication space 50 of the second cover member 2.

Other Embodiments of Present Disclosure

The embodiment disclosed this time should be considered illustrative in all aspects, rather than restrictive.

(1) Although the first and second cover members have the same shape in the above embodiment, these cover members may have different shapes.

(2) Although two wire lead-out ports are provided in the above embodiment, only one wire lead-out port may be provided.

(3) Although the restricting portion and the escaping space are provided on the inner angle side of each of the first and second bend parts in the above embodiment, the restricting portion and the escaping space may be arranged only on the inner angle side of one wire path. Further, the restricting portion may be arranged only on the inner angle side of one wire path and the escaping space may be arranged only on the inner angle side of the other wire path.

(4) Although the bending angle of the bend part is $\pi/2$ radians (90°) in the above embodiment, the bending angle may be other than $\pi/2$ radians (90°).

(5) Although the bending angle of the first bend part and that of the second bend part are equal in the above embodiment, these bending angles may be different.

(6) In the above embodiment, some or all of the lock portions of the first cover member may be lock receiving portions and the lock receiving portions of the second cover member corresponding to these lock portions may be lock portions. Further, some or all of the lock receiving portions of the first cover member may be lock portions and the lock portions of the second cover member corresponding to these lock receiving portions may be lock receiving portions.

(7) Although some of a plurality of wires are led out from the first wire lead-out port and the remaining wires are led out from the second wire lead-out port in the above embodiment, all the wires may be led out from the first or second wire lead-out port.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A wire cover, comprising a first cover member and a second cover member for covering a wire in a united state, wherein:
    each of the first and second cover members includes a wire path, a restricting portion and an escaping space,
    the wire path is a path in which the wire is arranged and which includes a bend part,
    the restricting portion and the escaping space are provided on an inner angle side of the bend part of the wire path, and
    in the united state, the restricting portion of the first cover member projects toward the second cover member, the restricting portion of the second cover member projects toward the first cover member, the restricting portion of the second cover member is arranged in the escaping space of the first cover member and the restricting portion of the first cover member is arranged in the escaping space of the second cover member.

2. The wire cover according to claim 1, wherein:
    each of the first and second cover members includes a wire lead-in port, a first wire lead-out port and a second wire lead-out port,
    the first and second wire lead-out ports are open in directions different from each other,
    the wire paths include a first wire path arranged from the wire lead-in port to the first wire lead-out port and a second wire path arranged from the wire lead-in port to the second wire lead-out port,
    the bend parts include a first bend part provided between the wire lead-in port and the first wire lead-out port and a second bend part provided between the wire lead-in port and the second wire lead-out port,
    the restricting portions include a first restricting portion provided on an inner angle side of the first bend part and a second restricting portion provided on an inner angle side of the second bend part in each of the first and second cover members,
    the escaping spaces include a first escaping space provided on the inner angle side of the first bend part and a second escaping space provided on the inner angle side of the second bend part in each of the first and second cover members, the second restricting portion of the second cover member is arranged in the first escaping space of the first cover member and the first restricting portion of the first cover member is arranged in the second escaping space of the second cover member in the united state, and the first restricting portion of the second cover member is arranged in the second escaping space of the first cover member and the second restricting portion of the first cover member is arranged in the first escaping space of the second cover member in the united state.

3. The wire cover according to claim 2, wherein:

the first escaping space and the second restricting portion are arranged at positions line-symmetrical with respect to a line of symmetry passing through a center of the wire lead-in port in each of the first and second cover members, the second escaping space and the first restricting portion are arranged at positions line-symmetrical with respect to the line of symmetry in each of the first and second cover members, and the first and second restricting portions are arranged at positions non-symmetrical with respect to the line of symmetry in each of the first and second cover members.

4. The wire cover according to claim 3, wherein the first and second cover members have the same shape.

5. The wire cover according to claim 1, wherein:

the escaping space of the first cover member has a communication space communicating with the wire path, the restricting portion of the second cover member includes a path-side restricting portion to be arranged in the communication space of the first cover member, and a tip part of the path-side restricting portion has an inclined surface inclined in a direction to expand the wire path.

* * * * *